(12) United States Patent
Bunting et al.

(10) Patent No.: US 8,597,724 B2
(45) Date of Patent: Dec. 3, 2013

(54) CORROSION PROTECTIVE COATING THROUGH COLD SPRAY

(75) Inventors: Billie W. Bunting, Colchester, CT (US); Andrew DeBiccari, North Branford, CT (US); Chris Vargas, Hamden, CT (US); Monika D. Kinstler, Glastonbury, CT (US); Derek W. Anderson, Cromwell, CT (US)

(73) Assignee: United Technologies Corporation, Hartford, CT (US)

( * ) Notice: Subject to any disclaimer, the term of this patent is extended or adjusted under 35 U.S.C. 154(b) by 1921 days.

(21) Appl. No.: 11/825,384

(22) Filed: Jul. 6, 2007

(65) Prior Publication Data
US 2009/0011123 A1 Jan. 8, 2009

(51) Int. Cl.
*B23P 6/00* (2006.01)
*C23C 24/04* (2006.01)

(52) U.S. Cl.
USPC ............ 427/142; 427/8; 427/383.7; 427/405; 427/410; 427/180; 427/270; 427/275; 427/287; 29/889.1

(58) Field of Classification Search
USPC ........................................ 427/142
See application file for complete search history.

(56) References Cited

U.S. PATENT DOCUMENTS

| | | | |
|---|---|---|---|
| 5,344,696 A * | 9/1994 | Hastings et al. | 428/220 |
| 5,972,424 A * | 10/1999 | Draghi et al. | 427/142 |
| 6,334,617 B1 * | 1/2002 | Putnam et al. | 277/415 |
| 6,491,208 B2 * | 12/2002 | James et al. | 228/119 |
| 6,597,947 B1 | 7/2003 | Inoue et al. | |
| 6,780,458 B2 | 8/2004 | Seth et al. | |
| 6,827,969 B1 | 12/2004 | Skoog et al. | |
| 6,905,728 B1 | 6/2005 | Hu et al. | |
| 7,207,373 B2 | 4/2007 | Parkos et al. | |
| 2004/0110021 A1 | 6/2004 | Seth et al. | |
| 2004/0202885 A1 | 10/2004 | Seth et al. | |
| 2005/0106316 A1 * | 5/2005 | Rigney et al. | 427/140 |
| 2006/0000183 A1 | 1/2006 | Larsen et al. | |
| 2006/0121183 A1 * | 6/2006 | DeBiccari et al. | 427/142 |
| 2006/0134320 A1 * | 6/2006 | DeBiccari et al. | 427/140 |

FOREIGN PATENT DOCUMENTS

| | | | |
|---|---|---|---|
| EP | 1 582 862 | * | 10/2005 |
| EP | 1666635 A1 | | 6/2006 |
| EP | 1674595 A2 | | 6/2006 |

OTHER PUBLICATIONS

Colonial Coatings Painting, Pratt and Whitney Aircraft Paint, from web.archive.org, date of Aug. 24, 2004, one page.*

* cited by examiner

*Primary Examiner* — Katherine A Bareford
(74) *Attorney, Agent, or Firm* — Bachman & LaPointe, P.C.

(57) ABSTRACT

Methods for repairing gas turbine components damaged by corrosion that not only restores the components back to their original dimensions to ensure proper engine operations, but also have the added benefit of mitigating future corrosion attacks thereby extending the useful life of the components.

14 Claims, 6 Drawing Sheets

CORROSION PROTECTIVE COATING THROUGH COLD SPRAY

BACKGROUND OF THE INVENTION

The invention relates generally to the field of repairing gas turbine components that have experienced corrosion damage. More specifically, the invention relates to methods that extend component life by reducing or eliminating further corrosion damage which would cause the component to be scrapped.

Gas turbine engine components, such as fan cases and gearboxes, are typically constructed of aluminum and magnesium alloys. These alloys are susceptible to corrosion due to exposure to the environment during regular service in the field. For example, damage can be caused due to the presence of water or moisture on the fan exit outer case. In addition, environmental conditions such as chemical fallout, saltwater, and others can exacerbate corrosion. The corrosion deteriorates the component's parent material and reduces its wall thickness. In some instances, the component's wall thickness is reduced to the point where the component cannot be repaired.

Current turbine component repair methods allow for dimensional restoration of aluminum and magnesium structures using a variety of techniques such as epoxy bonding, plasma spray, high velocity oxygen fuel (HVOF) thermal spray, fusion welding, and others. High temperature repair techniques such as fusion welding may result in unacceptable component distortion and degrade the substrate material properties by over-aging or solutioning. Epoxy bonding can break or spall during service, allowing the environmental elements to attack the underlying parent material. Subsequent attacks on the parent material will deteriorate wall thickness such that the component must be scrapped.

What is desired is a method of repairing gas turbine components that have suffered corrosive deterioration by identifying and mitigating the corrosion attack before the component wall thickness has deteriorated below minimum strength requirements, and restoring the original component dimensions while offering added corrosion protection.

SUMMARY OF THE INVENTION

The inventors have recognized that it would be desirable to have methods of repairing corrosion damage to gas turbine components that not only restores the components back to their original dimensions to ensure proper engine operations, but also have the added benefit of mitigating future corrosion attacks thereby extending the useful life of the components.

One aspect of the invention provides methods for repairing a turbine component where the component original wall thickness remains above a component minimum wall thickness value after subsequent repair cycles. Methods according to this aspect of the invention preferably start with providing a component exhibiting corrosion, determining the component parent metallurgy where the corrosion is present, removing the corrosion from the component forming a prepared area, measuring the component wall thickness at the prepared area, depositing a restorative material onto the prepared area if the prepared area wall thickness is greater than the component minimum wall thickness value and scrapping the component if not, inspecting the deposited material, and finishing the component by removing excess deposited material.

Another aspect of the method is depositing the restorative material onto the prepared area using a non-oxidizing carrier gas such that the restorative material plastically deforms and bonds to the component and itself upon impact with the component surface.

Another aspect of the method is wherein the restorative material is selected from the group consisting of aluminum, magnesium, silicon or alloy mixtures thereof.

Other objects and advantages of the methods and systems will become apparent to those skilled in the art after reading the detailed description of the preferred embodiments.

DETAILED DESCRIPTION

Embodiments of the invention will be described with reference to the accompanying drawing figures wherein like numbers represent like elements throughout. Further, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1:
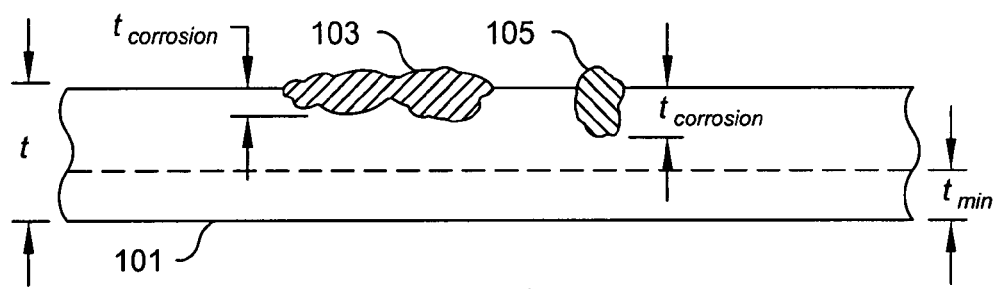
FIG. 1 is a cross section view of an exemplary turbine component that has experienced surface corrosion and pitting.
Figure 2:
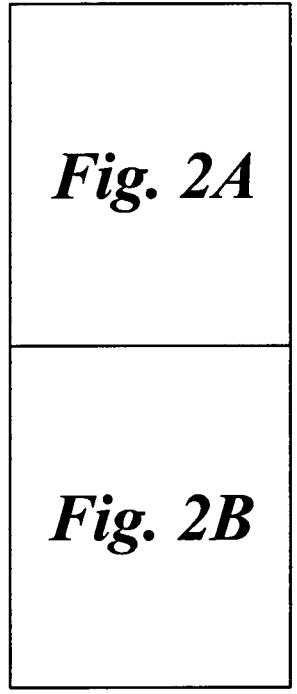
FIGS. 2, 2A and 2B are exemplary repair methods.
Figure 2A:
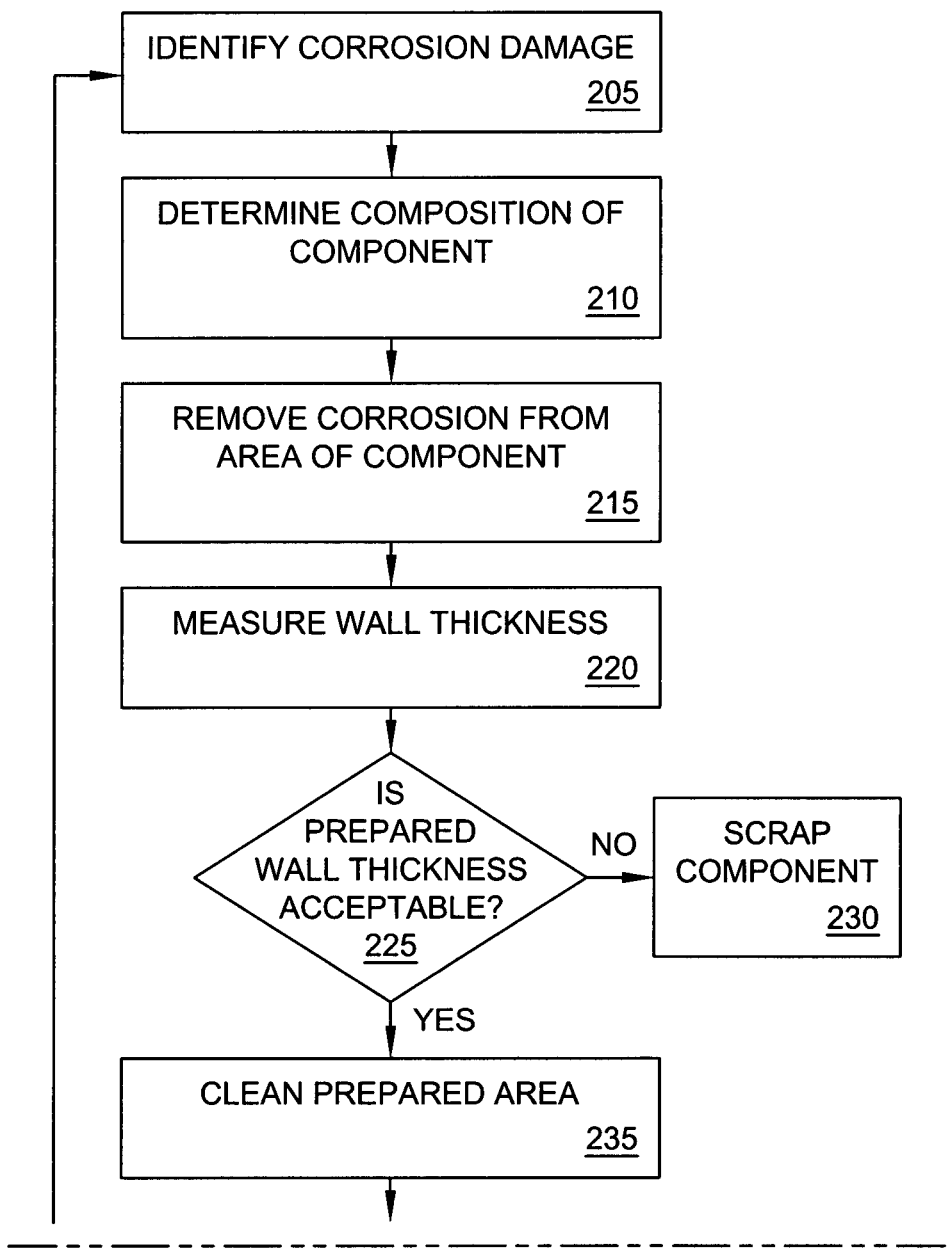
Figure 2B:
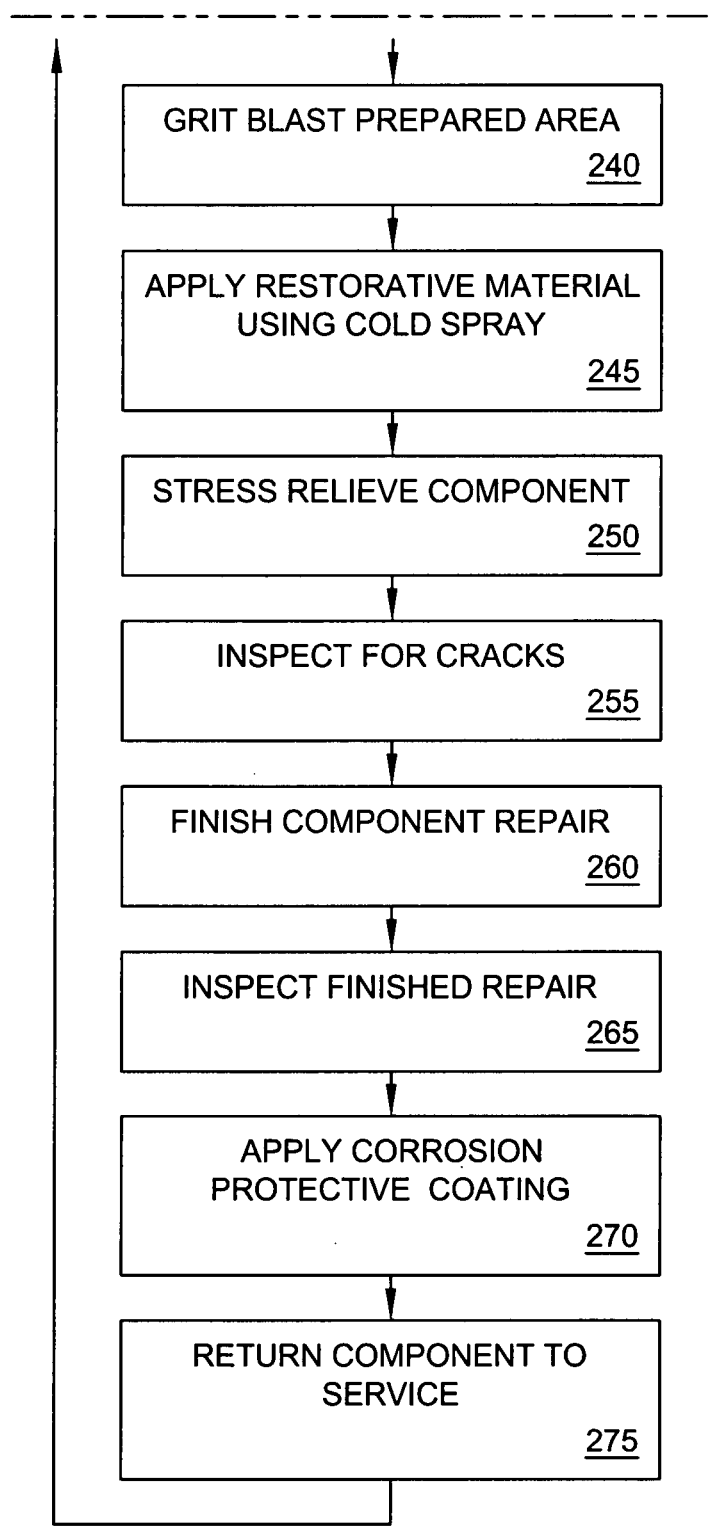

FIG. 1 shows an exemplary surface of a gas turbine engine component 101 exhibiting corrosion 103 and pitting 105, such as the interior surface of a fan case. FIGS. 2, 2A and 2B show the restoration method of the invention.

The method begins when a gas turbine engine component is removed from the engine for service due to damage caused by corrosion (step 205). A metallurgical examination may be performed to determine the composition of the component (step 210). The method is applicable to components manufactured using aluminum or magnesium, or alloys of the two metals.

Figure 3:
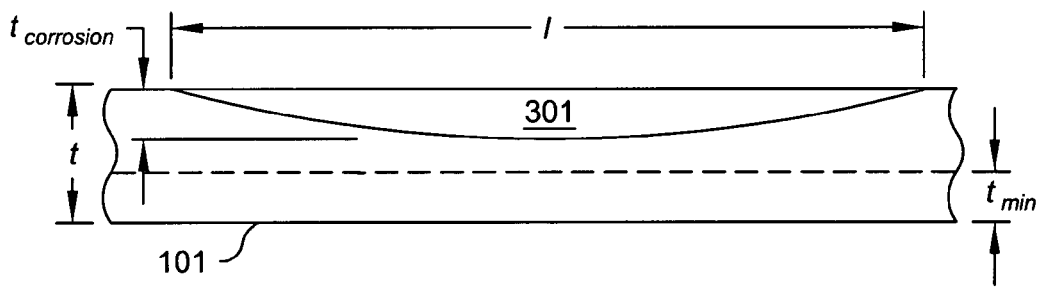
FIG. 3 is a cross section view of the turbine component after corrosion removal according to a blend length-to-depth ratio.

Surface corrosion 103 and pitting 105 are removed from the component 101 (step 215) forming a prepared area. A minimum blend length-to-depth ratio ($1:t_{corrosion}$) of 20:1 is used to determine how much parent material around the corrosion or pit is removed in order to prepare the area for a repair. FIG. 3 shows how the blend ratio gradually feathers the repair area 301 around the corrosion area to the component 101 surface. The blend length-to-depth ratio eliminates or minimizes any stress concentrations associated with abrupt geometry changes in the component 101. The corrosion is removed mechanically or chemically through grinding, machining, etching, or other applicable techniques. The resulting surface may or may not be grit blasted.

The maximum depth of the prepared area $t_{corrosion}$ is measured and subtracted from the component original thickness t to determine a prepared area wall thickness $(t-t_{corrosion})$ (step 220). Any industry accepted measuring technique may be used.

If the prepared area wall thickness is greater than a component minimum wall thickness $(t-t_{corrosion}) > t_{min}$ (step 225), the area is cleaned using an acceptable cleaning agent such as isopropyl alcohol (step 235). The component is then grit blasted using any acceptable media such as aluminum oxide for example (step 240). If the prepared area wall thickness is less than or equal to the component minimum wall thickness $(t-t_{corrosion}) \leq t_{min}$, the component is scrapped (step 230).

The invention may use any deposition process that provides sufficient energy to accelerate particles to a high enough velocity such that, upon impact, the metal particles plastically deform and bond to a surface, building a relatively dense coating or structural deposit. A surface may be the original surface of the component, or a previously applied layer of the metal, where the metal powder may bond to the original component as well as to itself. The deposition process does not metallurgically transform the particles from their solid state.

Various techniques to achieve this type of particle deposition have been evaluated and reduced to practice such as cold gas dynamic spraying (cold spray deposition), kinetic metallization, electromagnetic particle acceleration, modified high velocity air fuel spraying, or high velocity impact fusion (HVIF). These are examples of high velocity deposition processes where metallurgical transformation of powder metal particles is not encountered. Preferably, the invention uses the cold spray deposition process. However, the invention may use other cold deposition processes.

The cold spray process has been found to be most useful in effecting repairs of components formed from ductile materials. For example, the cold spray process may be used during the repair of turbine engine components, such as a fan inner case or a gearbox, formed from aluminum or magnesium based materials.

Suitable aluminum containing materials which may be used to effect repairs in accordance with the invention include, but are not limited to, pure aluminum, aluminum alloy 6061 which contains magnesium and silicon, aluminum alloy 2219, Al-12Si alloy, Al—Sc alloy, and aluminum alloy 6061/B4C. In a preferred embodiment of the present invention, the aluminum containing material comprises a material which has a composition that includes more than 50% by weight of aluminum.

The method uses cold spray deposition where a supersonic gas jet is formed by a converging/diverging nozzle and is used to accelerate the powder particles towards the substrate to produce cold spray coatings. In this process, the coating materials are not heated to high temperature and hence no oxidation, decomposition or other degradation reactions of the feedstock material occur.

Figure 4:
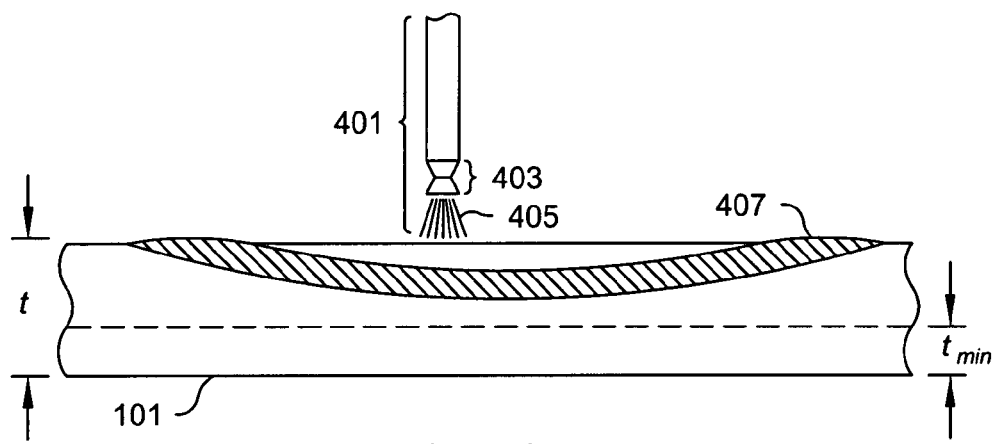
FIG. 4 is a cross section view of the turbine component while undergoing repair using cold spray.

FIG. 4 shows a system for effecting repairs to a prepared area 301 of a component 101. The system includes a spray gun 401 having a converging/diverging nozzle 403 through which the repair material 405 is sprayed onto an affected area of the component 101 to be repaired. During deposition of the repair material, the component 101 may be held stationary or may be articulated or translated by any suitable means (not shown) known in the art. Alternatively, the spray nozzle 403 may be held stationary or may be articulated or translated. In some situations, both the component 101 and the nozzle 403 may be manipulated.

In the method, the repair material or powder feedstock is a powdered aluminum containing material. The repair powder may be a material of −325 mesh with particle sizes in the range of from 5 microns to 50 microns. Smaller particle sizes such as those mentioned before enable the achievement of higher particle velocities. Below 5 microns in diameter, the particles risk getting swept away from the surface and/or the affected area 301 due to a bow shock layer above the surface and/or the affected area 301. This is due to insufficient mass to propel the particles through the bow shock. The narrower the particle size distribution, the more uniform the particle velocity will be. This is because if one has large and small particles (bi-modal), the small ones will hit the slower, larger ones and effectively reduce the velocity of both.

The fine particles of the repair powder may be accelerated to supersonic velocities using compressed gas, such as helium, nitrogen, or other inert gases, and mixtures thereof. Helium is a preferred gas because it produces the highest velocity due to its low molecular weight.

To achieve a good quality coating in a reproducible manner, the invention sets forth operational parameters to obviate too high of a gas preheat temperature where softening of the repair powder may occur contributing to nozzle fouling, too low of a gas preheat temperature, for example, below 250° C. where the powder particles do not attain the required critical velocity and will bounce off rather than adhere to a surface. Powder-feed rates that are too high may lead to loading of the gas jet. Loading is where too much repair powder is admitted to the main gas stream and disrupts flow through the nozzle.

The method of the invention sets forth predetermined cold spray deposition process parameters in the ranges shown in Table 1.

TABLE 1

| Parameter | Value |
| --- | --- |
| Nozzle type | circular |
|  | rectangle |
| Gas type | nitrogen |
|  | helium |
|  | mixtures |
| Gas flow rate | 0.001-150 SCFM |
| Gas pressure (gun) | 10-35 bar |
| Carrier gas pressure (hopper) | 0.6-3.5 bar |
| Gas temperature | 75-650° C. |
| Powder feed rate | 10-100 g/min |
| Stand off distance | 10-50 mm |

The bonding mechanism employed by the method of the invention for transforming the repair powder into a coating is strictly solid state, meaning that the particles do not melt. The repair powder plastically deforms upon impact at high velocity, bonding to the substrate and any previously deposited repair powder. Any oxide layer that is formed on the particles, or is present on the component surface, is broken up and fresh metal-to-metal contact is made at very high pressures.

The repair powder used to form the deposit may be fed to the spray gun 401 using any suitable means known in the art, such as modified thermal spray feeders. Fluidized bed feeders and barrel roll feeders with an angular slit may also be used.

In the method, the feeders may be pressurized with a gas selected from the group consisting of helium, nitrogen, other inert gases, and mixtures thereof. Feeder pressures are generally 1 bar above the main gas or head pressures, which pressures are usually in the range of from 10-35 bar, depending on the powdered repair material composition.

The main gas is heated so that gas temperatures are in the range of from 75° C. to 650° C. If desired, the main gas may be heated as high as approximately 675° C. depending on the material being deposited. The gas may be heated to keep it from rapidly cooling and freezing once it expands past the throat of nozzle. The net effect is a surface temperature on the component being repaired of about 35° C. to 100° C. during deposition. Any suitable means known in the art may be used to heat the gas.

To deposit the repair powder, the nozzle 403 may pass over the prepared area 301 more than once. The number of passes required is a function of the thickness of the deposit. The method is capable of forming a deposit having any desired thickness. When applying the repair powder, it is desirable to limit the thickness per pass in order to avoid a quick build up of residual stresses and unwanted debonding between deposit layers.

The main gas that is used to deposit the particles onto the surface may be passed through the nozzle at a flow rate of from 0.001 SCFM to 150 SCFM, preferably in the range of from 15 SCFM to 35 SCFM. The foregoing flow rates are preferred if helium is used as the main gas. If nitrogen is used by itself or in combination with helium as the main gas, the nitrogen gas may be passed through the nozzle at a flow rate of from 0.001 SCFM to 30 SCFM, preferably from 4 to 30 SCFM. Alternatively, the nozzle 403 may have a single inlet which is connected to a valve for switching between two gases.

The main gas temperature may be in the range of from 75° C. to 650° C., preferably from 200° C. to 500° C., and most preferably from 300° C. to 400° C.

The pressure of the spray gun may be in the range of from 10 bar to 35 bar, preferably from 10 bar to 25 bar and most preferably 12 bar to 19 bar (step 245). The repair powder is fed from a hopper, which is under a pressure of 0.6 bar to 3.5 bar higher than the specific main gas pressure, preferably 1 bar higher, to the spray gun 401 via a line at a rate in the range of from 10 grams/min to 100 grams/min, preferably from 11 grams/min to 17 grams/min.

The repair powder is fed to the spray gun using a non-oxidizing carrier gas. The carrier gas may be introduced having a pressure in a range of from 10 bar to 35 bar and at a flow rate of from 0.001 SCFM to 150 SCFM, preferably from 8 SCFM to 15 SCFM. The foregoing flow rate is useful if helium is used as the carrier gas. If nitrogen by itself or mixed with helium is used as the carrier gas, a flow rate of from 0.001 SCFM to 30 SCFM, preferably from 4 to 10 SCFM, may be used.

The nozzle spray distance from the component surface is not determined by the deposit thickness. Preferably, the spray distance is in a range of from 10 mm to 50 mm. For example, if a 2.5 mm thick deposit is required, the nozzle 403 may begin at a starting spray distance of 25 mm. As the repair powder is deposited, the nozzle distance of 25 mm is maintained from the surface of the deposited repair powder, not the original component surface. In this manner, the same distance is maintained regardless of the deposited material thickness. The deposition process is insensitive to small variations in nozzle spray distance. For some deposits of less than a predetermined thickness, such as 5 mm, the nozzle spray distance may not require adjusting as deposition progresses.

The velocity of the repair powder particles leaving the spray nozzle may be in the range of from 825 m/s to 1400 m/s, preferably from 850 m/s to 1200 m/s. The deposit thickness per pass may be in the range of from 0.02 mm to 0.8 mm.

The repair powder 407 may be sprayed over the prepared area 301 on the component 101 to a height above the original wall thickness t. After the repair material 407 has been deposited, the component 101 may be heat treated (stress relieved) to recover the ductility of the repair material (step 250).

The heat treatment may be carried out at a temperature which satisfactorily improves the ductility for the repair material 407 without degrading the substrate material properties. For example, the heat treatment may be one in which the component 101 with the cold sprayed deposit 407 is heated in an air oven to a temperature in a range of 155 to 165° C. for a period of 4 to 18 hours, for 6061-T6 aluminum substrate and 6061 aluminum powder. When some aluminum containing repair materials are used, no heat treatment may be needed. When other aluminum containing repair materials are used, the heat treatment may be at a temperature which varies from 35° C. to a temperature greater than 260° C. for a time period in the range of 1 to 24 hours. When a heat treatment is required, it may be applied globally to the entire component or locally in the area of the repair.

Figure 5:
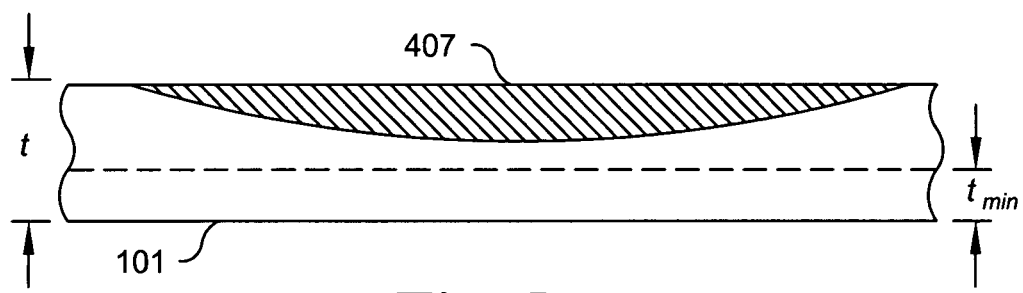
FIG. 5 is a cross section view of the turbine component after surface finishing.

After any heat treatment has been completed, the component 101 with the deposited repair material may be inspected for cracks using fluorescent penetrants (step 255). The component 101 is then mechanically smoothed and blended to make sure there are no perceptible transitions between the original and deposited surfaces and to return the component 101 back to its original OEM wall thickness t as shown in FIG. 5 (step 260). The repaired component 101 is then inspected (step 265).

Cold spray offers many advantages over other metallization processes. Since the aluminum containing powders used for the repair material are not heated to high temperatures, no oxidation, decomposition, or other degradation of the feedstock material occurs. Powder oxidation during deposition is also controlled since the particles are contained within the oxygen-free accelerating gas stream. Cold spray also retains the microstructure of the feedstock. Still further, because the feedstock is not melted, cold spray offers the ability to deposit materials that cannot be sprayed conventionally due to the formation of brittle intermetallics or a propensity to crack upon cooling or during subsequent heat treatments.

Cold spray, because it is a solid state process, does not heat up the component appreciably. As a result, any resulting distortion is minimized. Controlling component temperature also allows certain base material properties, obtained through prior heat treatments, to be retained. Cold spray induces compressive surface residual stresses, which can increase resistance to fatigue and brittle failures, resulting in more robust repairs.

A corrosion protective coating such as a chromate conversion coating may be applied onto repaired areas for additional corrosion resistance and protection. A primer and aluminized epoxy enamel layer may also be applied for additional corrosion resistance (step 270).

Figure 6:
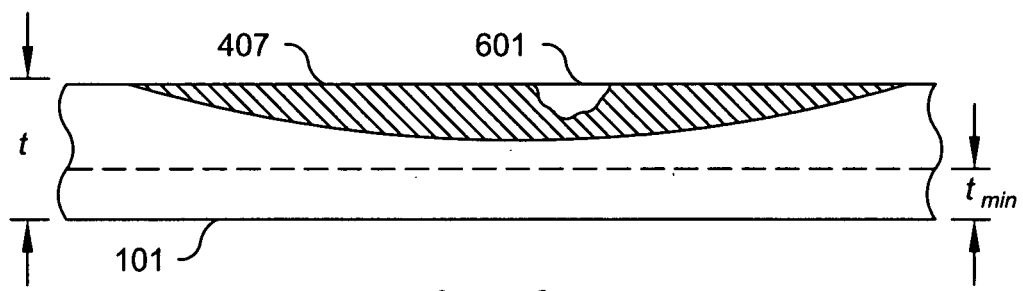
FIG. 6 is a cross section view of a repaired component which has undergone further corrosion damage after being returned to service.

The cold spray deposit may have the same alloy composition as the parent material and therefore have the same coefficient of expansion making it react the same as the parent material. The cold spray process also produces higher adhesive bond strength than most epoxy bonding and thermal spray processes. These attributes make it less likely the parent material underneath the cold spray deposit will be subjected to additional environmental conditions causing further corrosion 601 as shown in FIG. 6. Future corrosion 601 attacks the cold sprayed material 407 leaving the underlying parent material of the component 101 intact. The component 101 parent material minimum wall thickness $t_{min}$ is maintained.

Figure 7:
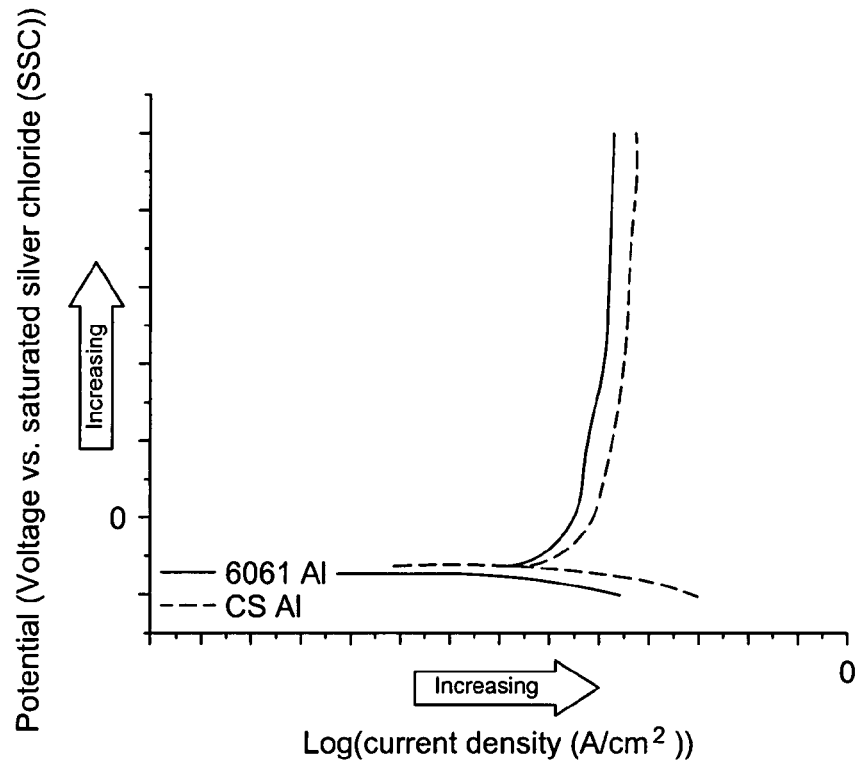
FIG. 7 is an exemplary plot showing potentiodynamic behavior of cold sprayed (CS) 6061 Al on a 6061 Al substrate and wrought 6061 Al samples exposed to a 0.5 $NH_2SO_4$ solution.
Figure 8:
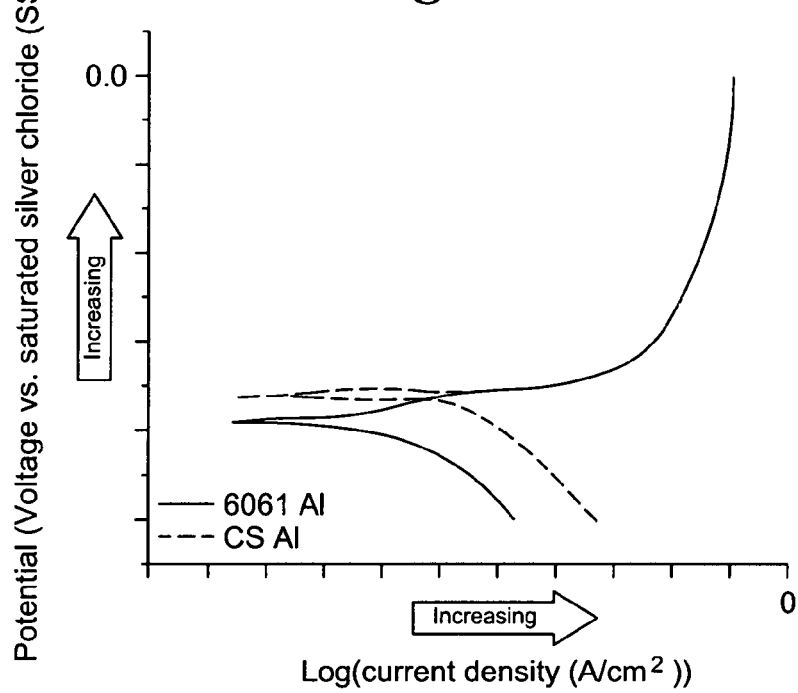
FIG. 8 is an exemplary plot showing potentiodynamic behavior of cold sprayed (CS) 6061 Al on a 6061 Al substrate and wrought 6061 Al samples exposed to a 0.5 N HCL solution.

Cold spray corrosion studies show a better corrosion protection in cold sprayed (CS) 6061 aluminum than in wrought 6061 aluminum. FIG. 7 shows a plot comparing wrought 6061 with CS 6061 exposed to an $H_2SO_4$ solution. FIG. 8 shows a plot comparing wrought 6061 with CS 6061 exposed to an HCL solution. In both studies, the corrosion potential for CS 6061 was higher than wrought 6061, this shows a higher potential needs to be applied to corrode the cold sprayed applied aluminum.

After repair, the component is returned to service (step 275). When the component is removed at the next scheduled service interval, it is inspected for corrosion damage. If corrosion is evident, the component can be repaired by the same method. The component can remain in service after subsequent service intervals because future corrosion attacks the deposited material and maintains the component 101 minimum wall thickness thus maintaining serviceability. The cold spray deposition is a sacrificial layer that can be deposited again and again indefinitely.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method for repairing a turbine component where the component original wall thickness remains above a component minimum wall thickness value after subsequent repair cycles comprising:
   providing a component exhibiting corrosion;
   performing a metallurgical examination of the component in an area where corrosion is present to determine a composition for the component;
   removing the corrosion from the component and forming a prepared area;
   measuring the component wall thickness at the prepared area;
   using a minimum blend length-to-depth ratio of 20:1 to determine a size for the prepared area;
   depositing a restorative material onto the prepared area if the prepared area wall thickness is greater than the component minimum wall thickness value and scrapping the component if not;
   inspecting the deposited material; and
   finishing the component by removing excess deposited material.

2. The method according to claim 1 wherein the deposited material has superior corrosion resistance than the component parent material.

3. The method according to claim 1 wherein depositing restorative material onto the prepared area further comprises using a non-oxidizing carrier gas such that the restorative material plastically deforms and bonds to the component prepared area surface and itself upon impact.

4. The method according to claim 1 wherein the restorative material is selected from the group consisting of aluminum, magnesium, silicon and mixtures thereof.

5. The method according to claim 4 further comprising feeding the restorative material to a spray nozzle at a feed rate of from 10 grams/min to 100 grams/min at a pressure in the range of from 10 bar to 35 bar using a carrier gas selected from the group consisting of helium, nitrogen, an inert gas and mixtures thereof.

6. The method according to claim 5 wherein the carrier gas comprises helium and the feeding step comprises feeding the helium to the nozzle at a flow rate of from 0.001 SCFM to 150 SCFM.

7. The method according to claim 6 wherein depositing further comprises passing the restorative material through the spray nozzle using a main gas selected from the group consisting of helium, nitrogen, and mixtures thereof at a main gas temperature in the range of from 75° C. to 650° C. and at a spray pressure in the range of from 10 bar to 35 bar.

8. The method according to claim 7 further comprising maintaining the spray nozzle at a distance from 10 mm to 50 mm from the component prepared area surface.

9. The method according to claim 1 further comprising heat treating the component after depositing the restorative material.

10. The method according to claim 9 wherein the heat treatment is at a temperature in the range of from 35° C. to 260° C. and at a time period in the range of from 1 to 24 hours.

11. The method according to claim 10 wherein the heat treatment may be applied globally to the entire component or locally in the prepared area.

12. The method according to claim 1 further comprising applying a corrosion protective coating after finishing the component.

13. The method according to claim 12 wherein the corrosion protective coating is a chromate conversion coating.

14. The method according to claim 12 wherein the step of applying said corrosion protective coating comprises applying a primer and aluminized epoxy enamel layer for additional corrosion resistance.

* * * * *